INVENTOR.
RUSSELL C. HENDRICK
BY *Gordon Reed*
ATTORNEY

United States Patent Office 3,082,979
Patented Mar. 26, 1963

3,082,979
CONTROL APPARATUS FOR DIRIGIBLE CRAFT
Russell C. Hendrick, Fridley, Minn., assignor to Minneapolis-Honeywell Regulator Company, Minneapolis, Minn., a corporation of Delaware
Filed Aug. 8, 1960, Ser. No. 48,130
9 Claims. (Cl. 244—77)

This invention relates to control apparatus involved with changing the attitude of a dirigible craft such as aircraft and particularly of such aircraft capable of attaining extreme altitudes or low dynamic air pressures. The flight envelopes of some aircraft or vehicles have wide extremes and in some instances extend beyond the earth's atmosphere where the dynamic air pressure is nearly zero, or the speed range of such vehicle may be such that at low speed the dynamic air pressure also approaches zero. In either case, the effectiveness of conventional control surfaces, involved in aerodynamic methods of control, on the attitude of the craft may decrease to zero. To compensate for such condition resulting from low dynamic air pressures, other methods of attitude control of the craft, rather than aerodynamic method, such as those obtained from reaction jets, may be utilized.

While aerodynamic and reaction methods of control may have been heretofore utilized in the same craft, the selection and utilization of the particular method or combination of methods may not have been accomplished at the appropriate time as changes in dynamic air pressure occurred.

An object of this invention is to provide a novel attitude control apparatus for a dirigible craft which blends aerodynamic control of the craft attitude which depends on dynamic air pressure with non-aerodynamic or reaction control of the craft attitude which is not dependent on dynamic air pressure, at the appropriate time.

A further object of this invention is to provide attitude control apparatus having multiple methods of changing craft attitude and novel means automatically blending both methods to control craft attitude.

A further object of this invention is to provide attitude control apparatus for a craft having aerodynamic and reaction type craft attitude changing means and integrating reaction attitude changing means with aerodynamic attitude changing means.

A further object of this invention is to provide attitude control apparatus for the craft having aerodynamic and reaction type craft attitude changing means and integrating reaction attitude changing means with aerodynamic attitude changing means, with such integration being effected as a result of the loss of aerodynamic control effectiveness.

A further object of this invention is to provide attitude control apparatus for a craft having aerodynamic and reaction type craft attitude changing means and automatically controlling the gain of operating means for the aerodynamic attitude changing means and to initiate operation of reaction control means when the gain of the operating aerodynamic means attains a constant value.

Further objects and advantages of the invention will be realized upon consideration of the accompanying description had in conjunction with the subjoined drawings.

The broad spectrum of environment of operation or wide ranges of dynamic air pressure to which some vehicles are subjected preclude the use solely of the conventional ailerons, elevator, or other surfaces to control the craft attitude. Such control must be supplemented by the utilization of reaction control devices. However, the blending of aerodynamic and non-aerodynamic (reaction) controls and the achievement of maximum reliability pose problems of particular significance.

As implied, the vehicle such as aircraft will utilize both reaction and aerodynamic control for maneuvering or for changing attitude of the craft about its axis. Transition from one form of means of changing attitude to the other will be provided. However, there undoubtedly will be significant gain changes in the moment-producing system (aerodynamic or reaction) whenever such transition is made.

In view of such gain changes, a particular advantage of the present arrangement is that gain changes are instantaneously compensated for so the control system performance is not compromised when either reaction or aerodynamic control is dominant.

The control system referred to comprises the various sensors which transmit intelligence to several motors to control the attitude changing means in the craft. In the present invention, instead of selecting a preset system for controlling attitude changing means, an adaptive control system which compensates for the above gain changes during the transition from aerodynamic to reaction control is utilized.

The adaptive control system selected and disclosed broadly herein is similar to the adaptive system shown in a prior application of Remus N. Bretoi S.N. 12,055, filed March 1, 1960. Such adaptive control system does not depend on variable quantities such as Mach number and dynamic pressure for scheduling feedback gains, and the adaptive system performance is not adversely affected by such factors as aerodynamic stability of the airplane, mass distribution, or external stores configuration on the aircraft.

Figure 1:
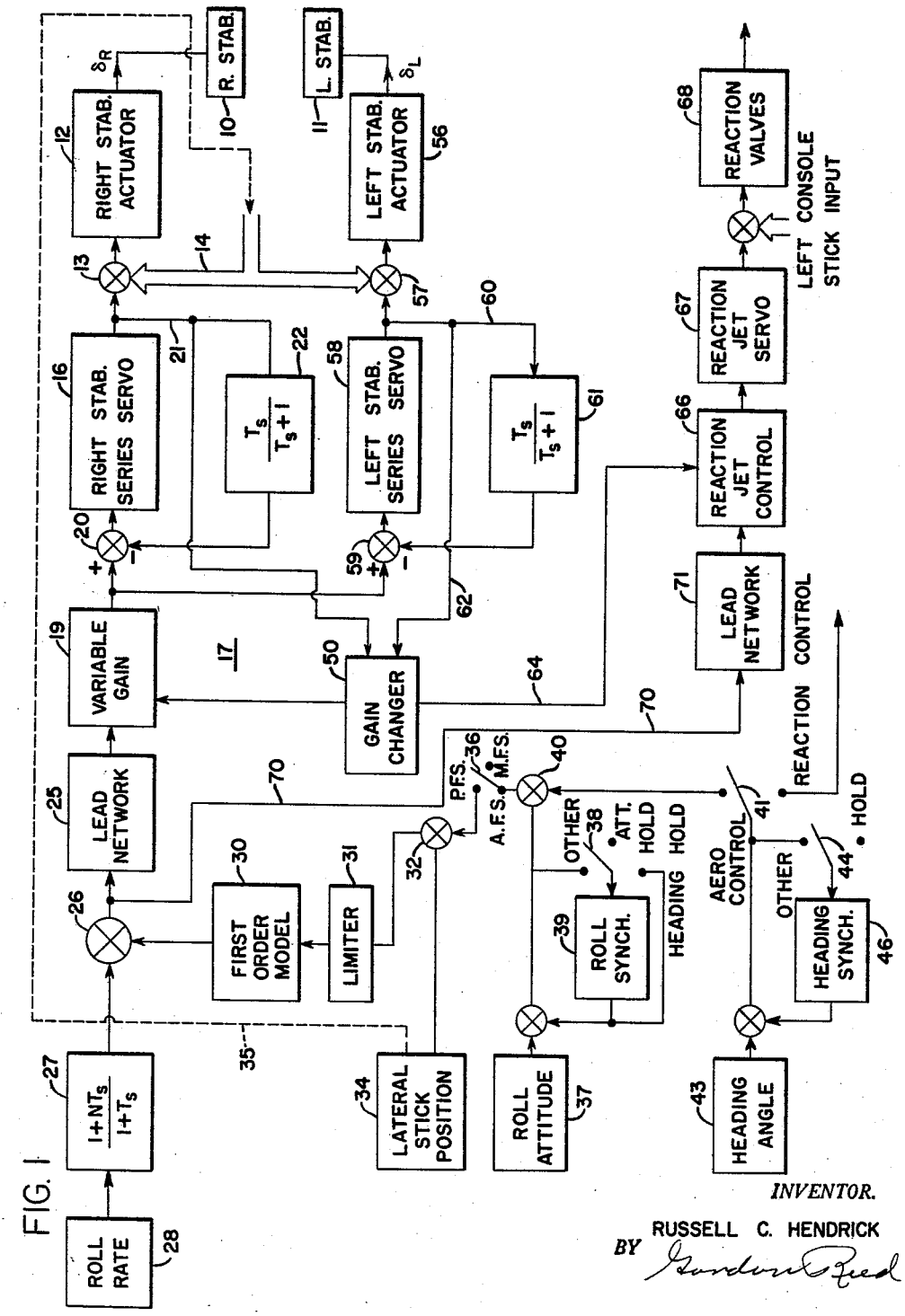
FIG. 1 is a block diagram of roll axis control apparatus for an aircraft including two methods of attitude control.

Coming now to the details of the invention, in the system illustrated in FIG. 1, a right stabilator 10 and left stabilator 11 of an aircraft may be operated in the manner of ailerons to control the aircraft about its longitudinal or roll axis. The right stabilator 10 is operated by a right stabilator actuator 12. Actuator 12 may be of the hydraulic type and may include a control valve which is differentially positioned by a manually operable means 14 or by a right stabilator series arranged servomotor means 16. The series servo means 16 is responsive to an adaptive controller 17 which is similar to that disclosed in the FIG. 2 of the aforesaid Bretoi application and identified by reference 12. In the adaptive controller herein, a variable gain amplifier 19 similar to the amplifier 53 of the Bretoi application has its output supplied to the right stabilator series servo 16. Such servo includes operable means to reversably control the direction of operation of the servo. The operation of servo 16 supplies a feedback signal which is supplied through connection 21 and high pass network 22 to the input of the servo 16 where it is summed at differential summing means 20 with the output of amplifier 19. The right stabilator series servo displacement signal is additionally supplied to gain changer 50. Variable gain amplifier 19 is controlled through a lead network 25 by a summing means 26 which receives control signals. One signal supplied to summing means 26 is obtained from a lead network 27 receiving a roll rate signal from a roll rate responsive device 28. This device may be a conventional rate gyroscope providing an electrical signal of a phase and magnitude dependent on direction and rate of roll of the craft.

Summing means 26 also receives additional control signals from a first order model 30 which has electrical signals supplied thereto through a limiter 31 from a second summing means 32.

Figure 2:
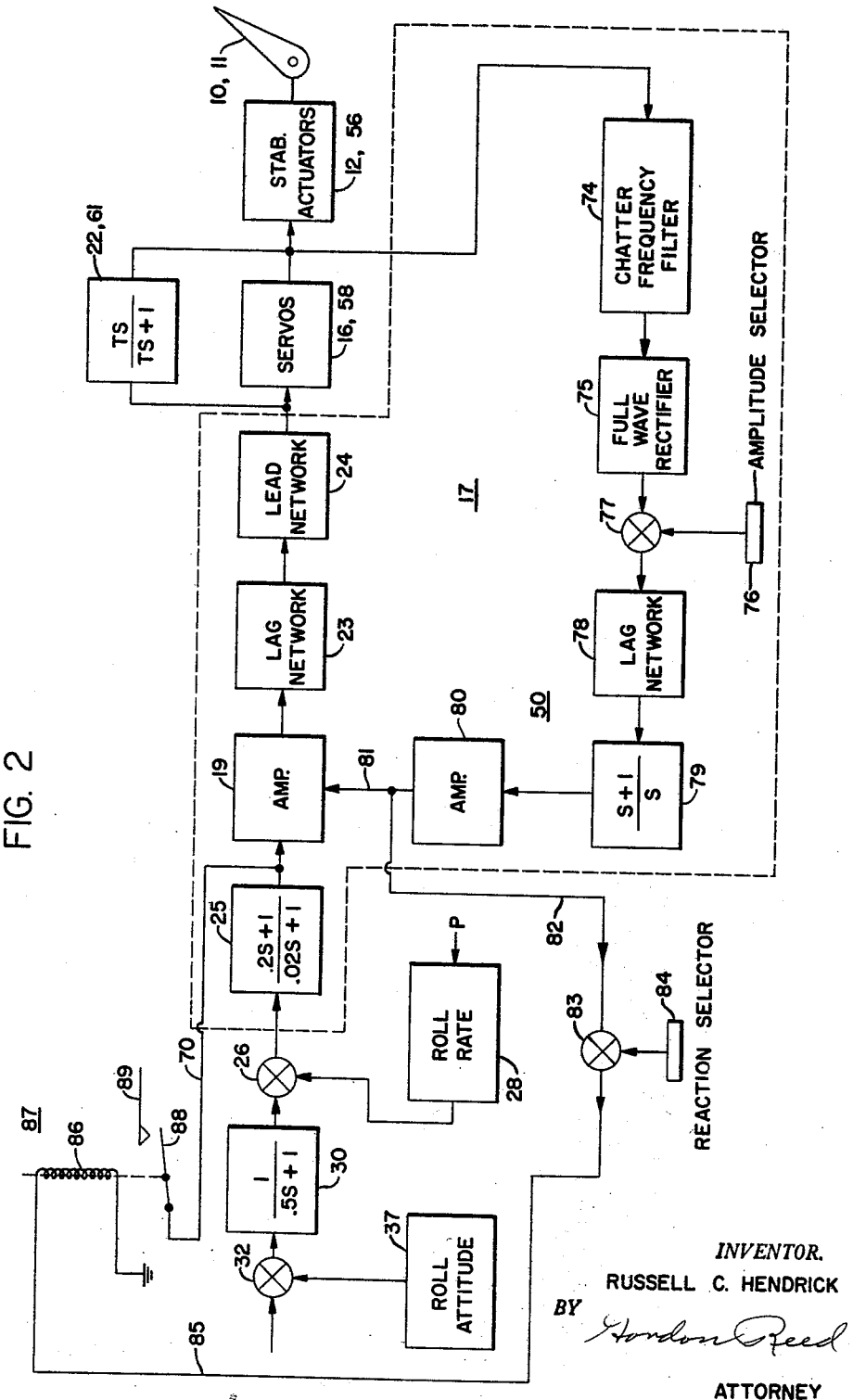
FIG. 2 is a schematic of one channel of an automatic pilot using novel selection means to blend aerodynamic and non-aerodynamic (reaction) attitude changing means.

The model 30 which provides an output corresponding to desired craft response may have a transfer function similar to that of model 23 in FIG. 2 of the aforesaid Bretoi application, when the control herein is applied about the roll axis of the craft and in generalized form may be written $$\frac{1}{T_s+1}$$

Structurally it may consist of a resistor R and capacitor C shown in Electronics, May 1949, pages 116–119 on transfer functions for R-C and R-L networks, see (1) page 116. However, should the control herein be applied to other axes such as pitch or yaw a different model transfer function would be utilized. In the pitch axis, probably a model having a second order such as (3) or (4) page 116 of the above publication rather than a first order transfer function would be used. The mathematical operator $p$ of the publication is the same as the operator $s$ herein and the order of the model is determined by the exponent of $p$ or $s$.

The second summing means 32 receives aircraft lateral stick position signals from the pilot operated control stick 34. The control stick 34 is mechanically linked through arrangement 35 to the manual input 14 so that the signal supplied to second summing means 32 is actually a stick force signal. This signal which may be obtained from a center topped D.C. energized potentiometer has a phase and magnitude dependent on the direction and magnitude of pilot force on the stick 34 and has the same direction of effect on actuator 12 as does the direct control stick input to summing means 13 from arrangement 35.

Through a selector switch 36 roll attitude signals, sensed by roll attitude device 37, may also be supplied to the summing means 32. An additional selector 38 connects a roll signal synchronizer 39 similar to bank synchronizer 25 in U.S. Patent 2,850,692 for the roll attitude device 37 to null out the roll attitude signal when the control system is in the control stick steering mode during which control stick 34 is operated by the pilot. Additionally, the selector 38 connects the roll synchronizer 39 with its own output during the "heading hold" mode to return the synchronizer to zero output.

Through a further selector 41 heading hold signals may be supplied to the summing means 40 to be summed with the roll attitude signal. The summing means 40 and 32 may be connected by switch 36 whereby the stabilators may be operated to change bank and thus change heading. The heading angle signal is supplied by sensing means 43 which may be a course deviation sensing device such as a directional gyroscope. A selector 44 may connect the output of the heading sensor 43 to a heading synchronizer 46 to null or balance the heading angle signal. This synchronizer is similar to the amplifier-motor combination (221, 222) of Patent 2,850,692.

The left stabilator is positioned by a left stabilator actuator 56 which may be differentially manually or automatically controlled. The automatic control is derived from a left stabilator series servomotor means 58 controlled through summing means 59 from the variable gain amplifier 19. Servo 58 supplies a servo displacement signal through transmission means 60 to a high pass network 61 which has its output supplied to summing means 59 in opposition to the output from amplifier 19. The left stabilator series servomotor displacement signal is additionally supplied through transmission means 62 to gain changer 50 in a similar manner to that in which the right stabilator series servo displacement signal is supplied to gain changer 50. The gain changer 50 controls the gain of amplifier 19 in the manner disclosed in the aforesaid Bretoi application to maintain a desired magnitude of residual oscillation in the series servos.

Coming now to the blending of the aerodynamic and the non-aerodynamic controls, the gain changer 50 has its output supplied also through transmission means 64 and thus also controls a reaction controller 66. Controller 66 controls reaction servo means 67 to supply through reaction valves 68 a reaction moment on the aircraft causing the craft to either roll in a left direction or roll in a right direction.

The direction in which the craft rolls depends upon the phase of the output signal from the summing means 26 which is transmitted through means 70, lead network 71, and thence to the reaction jet control 66 more fully considered hereinafter in FIG. 2.

Briefly in regard to FIG. 1, the gain of the adaptive controller 17 varies inversely with the effectiveness of control surfaces such as the stabilators 10 and 11. When a predetermined level of gain is reached in the aerodynamic portion of the adaptive controller 17, involving operation of the stabilators, any required increase in system gain as determined by the automatic gain modulator or gain changer 50 will be achieved in the reaction portion of the adaptive controller 17 in the loop connected to transmitting means 64 extending from gain changer 50 to reaction controller 66. The gain in the aerodynamic portion of the loop involving operation of the stabilators is held constant, and reaction controls are used to supplement the aerodynamic controls when the need for higher gain is sensed by the gain changer 50. When the system gain reaches still another predetermined level, it will no longer increase, resulting in a fixed gain reaction control system. In this region of the flight profile of the craft, the vehicle will display essentially constant performance characteristics, eliminating the need for variation and control parameters.

Coming now to FIG. 2 for a more detailed description of the blending of aerodynamic and non-aerodynamic controls, the gain changer 50, FIG. 1, has been expanded to include elements thereof in detail.

In FIG. 2 herein, the adaptive controller 17, in dotted outline, corresponds with the adaptive controller 12 of the aforesaid Bretoi application and thus the adaptive controller 17 with its gain changer 50 is not novel herein but a novel combination has been formed therewith. The primary element of novelty herein is in blending the aerodynamic control with the non-aerodynamic control automatically in response to the operation of the gain changer 50 as reflected in its output to amplifier 19 corresponding with amplifier 53 of the Bretoi application. The adaptive controller 17 like adaptive controller 12 of the aforesaid application includes a lead network 25, and modified linear amplifier 19, a lag network 23, a lead network 24, filter 74, full wave rectifier 75, residual oscillation magnitude selector 76 which may be a D.C. energized adjustable potentiometer, summing means 77, lag network 78, proportional plus integral network 79, amplifier 80.

The lead network 25 receives roll rate signals from roll rate device 28 along with the output of the analogue model 30 which is an electrical network having a transfer function or response to an input representative of the desired response of the craft to such form of input responsive to roll attitude control signals derived from the roll attitude 37. The rate signal and attitude control signal following passage through model 30 are summed at summing means 26 and applied to network 25.

The amplitude modulator or gain changer 50 comprising filter 74, rectifier 75, selector 76, network 78, network 79, and amplifier 80 functions to keep the adaptive loop gain at a critical value determined by the position of selector 76. The actual amplitude of the characteristic residual motion is taken as the operation of servos 16, 58, with the filter 74 passing only the frequency of the residual oscillation. The output of the filter 74 is transmitted to rectifier 75 and in turn its output is compared at summing means 77 with the residual amplitude magnitude selected from selector 76. The output of summing means 77 is applied through lag network 78, proportional plus integral network 79, to the amplifier 80 which as more fully disclosed in the aforesaid Bretoi application controls the gain of amplifier 19.

The output of amplifier 80 through transmission means 81, 82 is applied to summing means 83 where it is combined with a selected magnitude derived from the displacement of selector 84 which may be a D.C. energized variably adjustable potentiometer. The output of summing means 83, in this instance a voltage, is applied through transmitting means 85 to operating winding 86 of a single pole single relay 87. Relay 87 includes an arm 88 and "in" contact 89.

Figure 3:
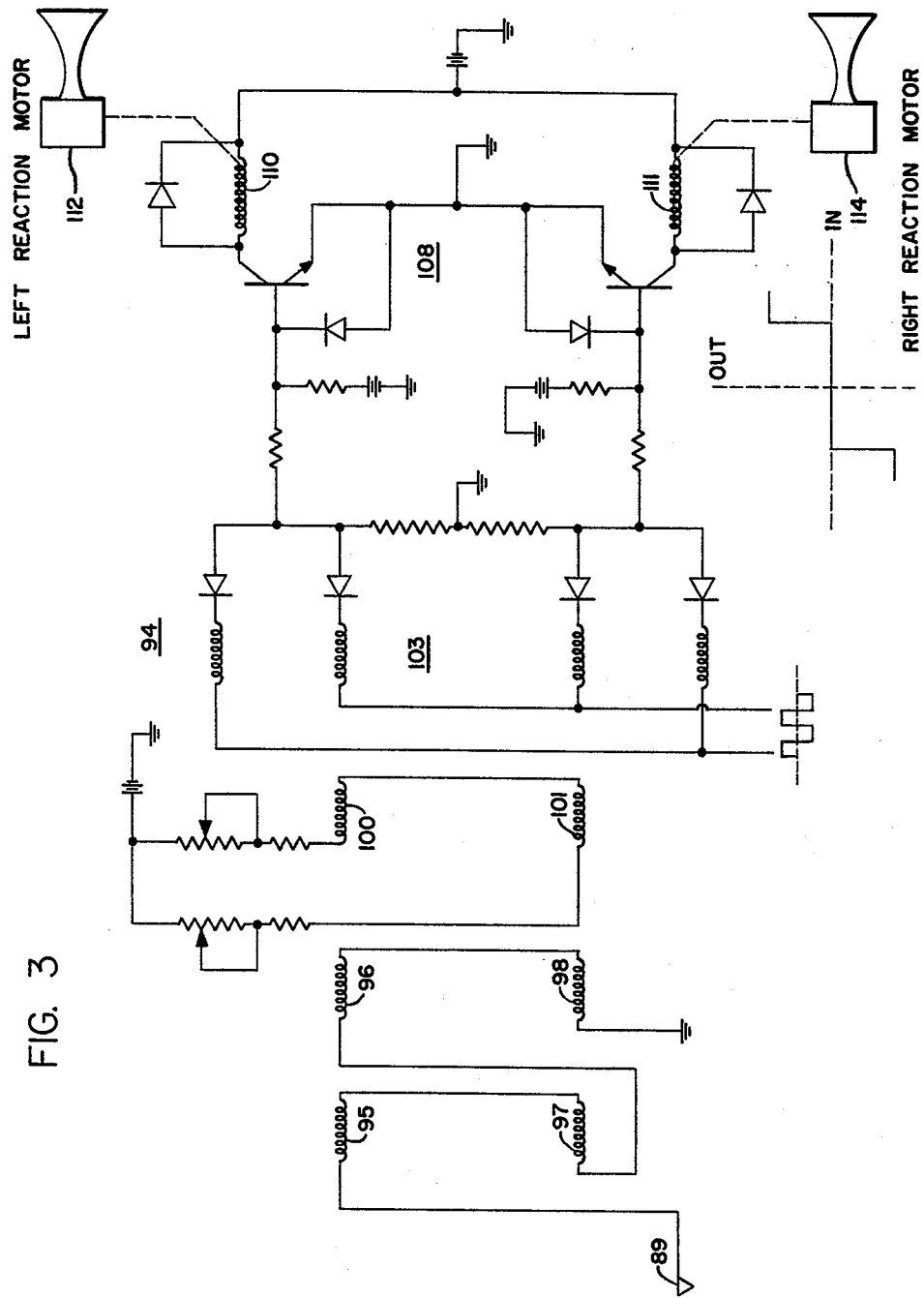
FIG. 3 is an electrical schematic of a switching amplifier and reaction motors for applying moments to the craft.

Essentially, as dynamic air pressure on the aircraft decreases and surface effectiveness decreases the output of amplifier 80 increases thereby tending ultimately to increase the amplitude of controlling motions of servos 16, 58 and control surfaces 10, 11. If the operation of the control surfaces 10, 11 do not properly control the craft, the voltage output of amplifier 80 when also summed with the selected magnitude voltage from knob 84 provides sufficient current through winding 86 of relay 87 to effect energization thereof. Upon engagement of relay arm 88 with contact 89, the output error of network 25 through transmitting means 70, relay arm 88, relay contact 89 is applied to the input side of a reaction motor control, phase sensitive magnetic switching amplifier 94 shown in detail in FIG. 3.

The voltage on relay contact 89 is supplied to input windings 95, 96, 97, 98 of the switching amplifier 94. Amplifier 94 consists of a magnetic amplifier-discriminator section 103 and a transistor amplifier section 108. Depending upon the polarity of the signal on relay contact 89, one or the other of reaction motor control windings 110, 111 are energized. The winding 110 controls an aircraft left roll reaction motor 112 and operating winding 111 controls an aircraft right roll reaction motor 114 in an on-off manner to provide reaction moment about the craft roll axis.

In the blended aerodynamic and nonaerodynamic control, through the flight regime of the craft wherein reaction controls (non-aerodynamic) are employed, the aerodynamic control loop is retained at a preselected maximum gain in spite of its lack of effectiveness. Thus, as the vehicle or aircraft returns to the atmosphere, should it be capable of departing therefrom, the aerodynamic loop can immediately sense the return of effectiveness of control surfaces 10, 11 and start reducing the system gain, resulting in a smooth transition from reaction controls by motors 112, 114 to aerodynamic controls by stabilators 10, 11.

However, if aerodynamic control energy is critical, this portion of the vehicle control system may be deenergized during the extreme altitude flight or low dynamic air pressures. In this case the aerodynamic control loop can be re-engaged periodically by servo means such as an internal timer, thus providing a sampling of the control surface effectiveness. This sampling would persist until the adaptive controller 17 indicated sufficiently high surface authority or effectiveness on the craft.

In FIG. 2, by means of the adjustment 84, when a predetermined level of aerodynamic control gain is reached, evidenced by the output of amplifier 80, relay 87 operates and the reaction control is introduced at a fixed gain (on-off), dependent upon the extent of adjustment of selector 84. However, the reaction controls are still not actually applied unless the system error becomes large as determined by the magnitude of the signal on transmission means 70.

The relation of input and output of the switching amplifier 94 as shown by its symbol adjacent the figure includes a dead spot. The output is subject to the magnitude of the input signal on the conductor 70. If this magnitude achieves or slightly exceeds the magnitude of the dead spot of either polarity, a fixed output or full on control energizing either one of windings 110, 111 results. This prevents extensive use of the reaction motors 112 and 114 except when needed.

It will now be apparent that a novel scheme for blending automatically, reaction and aerodynamic control functions has been provided and since many changes may be made in the above construction and many apparently widely different embodiments of this invention could be made without departing from the scope of said invention, it is intended that all matter contained in the above description or shown in the accompanying drawings shall be viewed as illustrative and not limiting the scope of the invention.

What is claimed is:

1. In control apparatus for an aircraft having aerodynamic and reaction means for changing craft attitude, a first motor means operating said aerodynamic means, a second motor means operating said reaction means, control means for said first motor means, operating means for the first control means, control means for said second motor means, further means altering the gain of said first motor means, and additional means responsive to said further means operating said second control means.

2. In control apparatus for an aircraft having aerodynamic and reaction means for changing craft attitude, first operating means for said aerodynamic means, second operating means for said reaction means, first adjustable control means for said first operating means, second control means for said second operating means, further means controlled by the first operating means adjusting said first control means thus compensating said first control means for loss in effectiveness of said aerodynamic means, and additional means responsive to said further means effective when said aerodynamic effectiveness can not be compensated for operating said second control means.

3. In control apparatus for a dirigible craft operable in low dynamic air pressure, first means including aerodynamic devices controlling the attitude of said craft, second means including reaction means controlling the attitude of said craft, further means operating said first means to apply a control moment to said craft and means for maintaining the gain of said further means to maintain the magnitude of the control moment including means for operating said second means to supplement the moment of said aerodynamic devices.

4. In control apparatus for an aircraft having first and second means for changing craft attitude, a first motor means operating said first means, a second motor means operating said second means, control means for said first motor means, operating means for the first control means, control means for said second motor means, further means altering the gain of said first control means, and additional means responsive to said further means operating said second control means.

5. In an automatic pilot for an aircraft having an aerodynamic control surface for changing craft attitude, reaction means for changing craft attitude, and a closed loop system operating said aerodynamic surface, said closed loop system comprising an input voltage source, a follow up voltage source responsive to a flight condition sensor on said craft, a linear amplifier and a servomotor operated by said amplifier and controlling operation of said aerodynamic surface, said amplifier being responsive to an error voltage derived from the difference of the input and follow up voltages; means for controlling the gain of the closed loop system to maintain its operation close to the neutral stability point of the closed loop system comprising, further means responsive both to the amplitude of the motion of the servomotor at the frequency of the system response adjacent the neutral stability point and the amplitude of a selected magnitude, connected to the gain control means, thereby varying the gain of said amplifier to compensate for loss in control surface effectiveness, and additional means responsive to the further means upon predetermined difference of the two amplitudes initiating operation of said reaction means when the control surface effectiveness, as indicated by the magnitude of the difference, cannot be compensated.

6. In an automatic closed loop control system for a dirigible craft operable over a wide range of dynamic air pressures and having aerodynamic and reaction means for changing craft attitude, an input voltage source, a follow up voltage source responsive to a flight condition sensor on said craft, a linear amplifier, a first servomotor operated by said amplifier and controlling operation of said aerodynamic means, wherein said amplifier is responsive to an error voltage derived from the difference of the input and follow up voltages, means for controlling the gain of the closed loop system to maintain its operation close to the neutral stability point of the closed loop system comprising further means responsive to the amplitude of the motion of the servomotor at the frequency of the system response adjacent the neutral stability point and the amplitude of a selected magnitude, varying the gain of said amplifier, and additional means controlled by the further means, a second servomotor operating said reaction means, and means controlling said second servomotor from said additional means.

7. In control apparatus for an aircraft having a first and a second means for changing craft attitude, a first motor means operating said first attitude changing means, a second motor means operating said second attitude changing means, a variable gain amplifier controlling said first motor means, means operating said amplifier, further means responsive to the amplitude of residual motion of said first motor means adjusting said further means to alter the gain of the amplifier to modify the amplitude of residual motion of said first motor means, and additional means responsive to the further means effecting operation of said second motor means.

8. The apparatus of claim 7, wherein said further means is additionally responsive to a magnitude representing a selected amplitude.

9. In control apparatus for an aircraft having aerodynamic and reaction means for changing craft attitude, first operating means for said aerodynamic means, second operating means for said reaction means, first control means for said first operating means, second control means for said second operating means, comparing means, further means adjusting said first control means from said comparing means, to compensate said first control means for loss of effectivenss of said aerodynamic means, selective means, means responsive to operation of the first operating means, said selective means and last named means being connected to said comparing means, and additional means responsive to said further means and effective when the comparing means has a predetermined output operating said second control means.

References Cited in the file of this patent

FOREIGN PATENTS 655,089    Great Britain _____ July 11, 1951

OTHER REFERENCES

Space/Aeronautics Magazine, February 1960, pages 46–49.